United States Patent [19]

Sakuma

[11] Patent Number: 4,985,266
[45] Date of Patent: Jan. 15, 1991

[54] PROCESS FOR PRODUCING FRIED FOOD

[75] Inventor: Ken Sakuma, Matsudo, Japan

[73] Assignee: Kenji Kenji Sakuma, Matsudo, Japan

[21] Appl. No.: 401,550

[22] Filed: Aug. 30, 1989

Related U.S. Application Data

[60] Continuation of Ser. No. 135,414, Dec. 21, 1987, abandoned, which is a division of Ser. No. 894,237, Aug. 6, 1986, Pat. No. 4,732,081.

[30] Foreign Application Priority Data

Aug. 19, 1985 [JP] Japan .................. 60-180583

[51] Int. Cl.$^5$ .................. A23L 1/01
[52] U.S. Cl. .................. 426/438
[58] Field of Search .............. 426/438, 439, 440, 441; 99/407

[56] References Cited

U.S. PATENT DOCUMENTS -

| | | | |
|---|---|---|---|
| 1,007,908 | 11/1911 | Ahrens | 426/438 |
| 2,855,308 | 10/1958 | Buechele et al. | 426/438 |
| 3,776,126 | 12/1973 | Veeneman et al. | 99/404 |
| 3,975,997 | 8/1976 | DiPietro | 99/407 |
| 3,977,390 | 8/1976 | Fogel et al. | 126/374 |
| 4,084,492 | 4/1978 | Sullivan | 99/330 |
| 4,287,818 | 9/1981 | Moore et al. | 99/407 X |
| 4,457,947 | 7/1984 | Schmidt et al. | 426/438 |
| 4,489,646 | 12/1984 | Schmidt et al. | 99/330 |
| 4,574,688 | 3/1984 | Barbieri | 99/407 X |
| 5,574,688 | 3/1986 | Barbier | 99/330 |

FOREIGN PATENT DOCUMENTS

| | | | |
|---|---|---|---|
| 2323133 | 12/1973 | Fed. Rep. of Germany . | |
| 59-21618 | 5/1984 | Japan . | |
| 0187747 | 10/1984 | Japan | 426/438 |
| 590-210853 | 11/1984 | Japan . | |

OTHER PUBLICATIONS

Patent Abstracts of Japan, Unexamined Applications, Field C, vol. 9, No. 45, Feb. 26, 1985. The Patent Office Japanese Government, p. 71, C 268 (Kokai No. 59-187748).

*Primary Examiner*—Arthur L. Corbin
*Attorney, Agent, or Firm*—Armstrong, Nikaido, Marmelstein, Kubovcik & Murray

[57] ABSTRACT

A process for producing a fried food, which comprises placing a starting material suitably applied with a necessary pretreatment into a fryer filled to an intermediate level with heated oil and from which air is evacuated, moving the material vertically to repeat the operation of dipping the material into the oil and withdrawing the material above the oil surface for several minutes, then allowing the material to rest in the oil for a while and finally draining off the oil by vibrating the material with small amplitudes above the oil.

This process can be carried out by using a device comprising a fryer vessel, equipped with a sealing lid at the upper portion on one side, a vacuum generating means for producing a vacuum in the vessel, a pipe for feeding heated oil which feeds the heated oil from an oil heater into said fryer vessel, a return pipe which returns used oil from said fryer vessel through an oil filter to the oil heater, a level gauge for monitoring the oil level of fryer vessel, an air cylinder which drives a waggle frame housed within the the fryer vessel vertically to dip the frame into the oil or withdraw the frame above the oil surface and a starting material case housed within the waggle frame so as to be freely dischargeable by opening the above sealing lid.

2 Claims, 3 Drawing Sheets

PROCESS FOR PRODUCING FRIED FOOD

This application is a continuation of application Ser. No. 135,414 filed Dec. 21, 1987, now abandoned, which is a division of application Ser. No. 894,237 filed Aug. 6, 1986, now U.S. Pat. No. 4,732,081.

BACKGROUND OF THE INVENTION

1. Field of the Invention

The present invention relates to a process for producing fried food from fruits such as apples, pineapples, etc., vegetables such as pumpkins, sweet potatoes, etc., and fish such as octopus, cuttlefish, short-necked clam, etc.

2. Description of the Related Art

In the prior art, this kind of fried food has been produced according to a frying process in which a basket containing a starting material is moved vertically in heated oil in a fryer vessel maintained under a reduced pressure while preventing mutual adhesion of the starting material in the shape of chips, as disclosed in Japanese Unexamined Patent Publication.(Kokai) No. 52-3848 and No. 59-210853.

However, since the frying process of the prior art as mentioned above merely moves the starting material vertically in the heating oil, the starting material is insufficiently dried, resulting in bending or destruction of the starting material. This gives rise to problems such that not only is the product value lowered, but also the product has an inferior taste and the oil content is markedly reduced.

SUMMARY OF THE INVENTION

Accordingly, the object of the present invention is to solve the above-mentioned problems of the prior art and to provide a method and a device for producing fried food which is not only capable of producing homogeneous products by frying the starting material evenly and uniformly but can also provide fried food having a good taste by draining the oil quickly therefrom.

In accordance with the present invention, there is provided a process for producing the fried food of the present invention, comprising placing a starting material suitably applied with a necessary pretreatment into a fryer filled to an intermediate level with heated oil, moving the material vertically to thereby repeat the operation of dipping the material into the oil and withdrawing it above the oil surface for several minutes, then leaving the material to rest in the oil for a while, and finally draining off the oil by vibrating the material with small amplitude vibrations above the oil.

In accordance with the present invention, there is also provided a device comprising a fryer vessel equipped with a sealing lid at the upper portion on one side, a pipe for feeding heated oil which feeds the heated oil from an oil heater into the fryer vessel, a return pipe which returns used oil from the fryer vessel through an oil filter to the oil heater, a level gauge for monitoring the oil level of the heated oil filled to an intermediate level in the fryer vessel, an air cylinder which drives a waggle frame housed within the dryer vessel vertically by dipping it into the oil or withdrawing it above the oil surface, and a starting material frying case which is housed within the waggle frame so as to be freely dischargeable by opening the above sealing lid.

BRIEF DESCRIPTION OF THE DRAWING

The present invention will be better understood from the description set forth below with reference to the accompanying drawings illustrating, but is not intended to be limited to, the preferred embodiments of the present invention, in which.

DESCRIPTION OF THE PREFERRED EMBODIMENT

Figure 1:
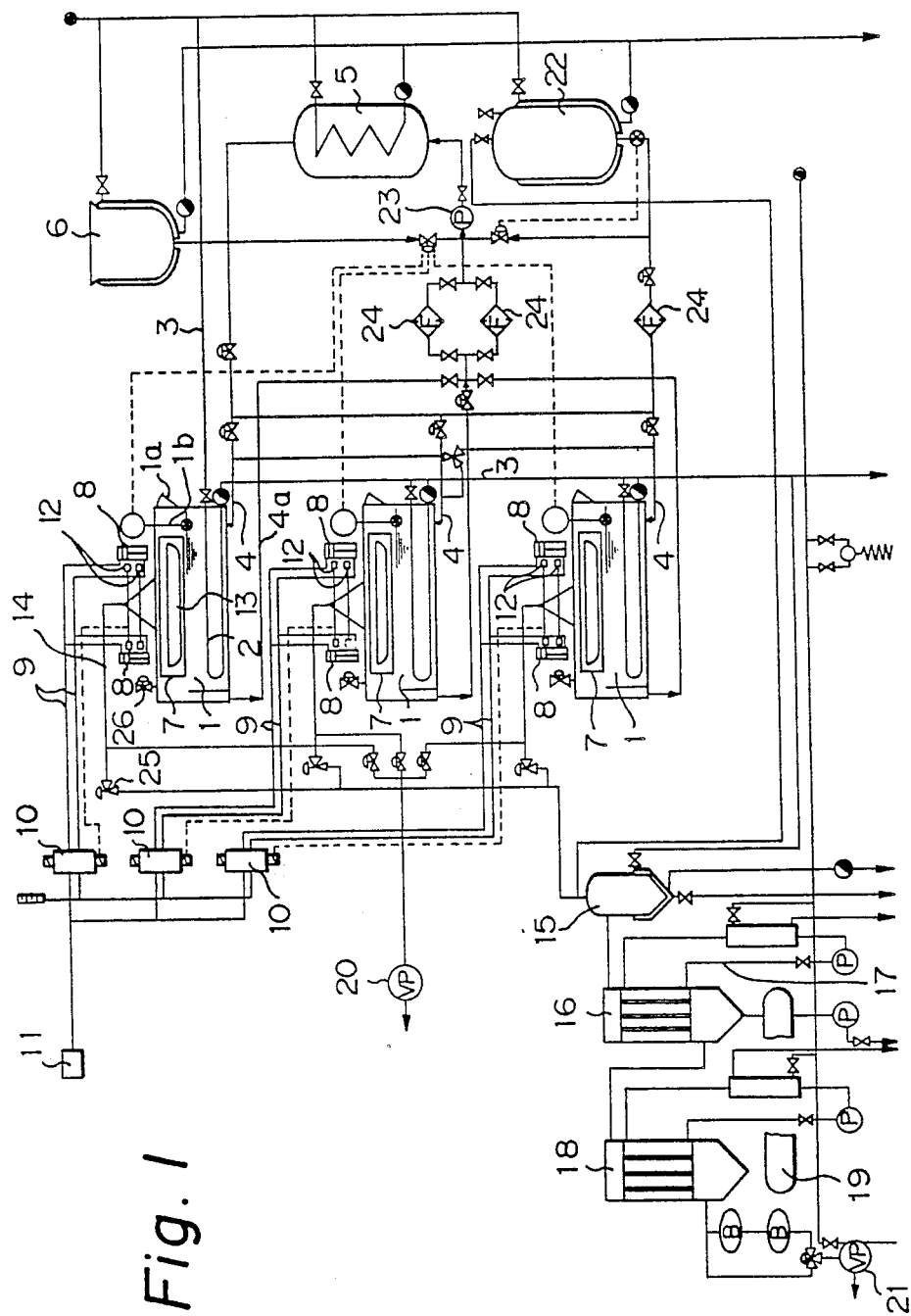
FIG. 1 is a schematic illustration showing an example of the vacuum fryer device for practicing the process of the present invention.

Referring now to the drawing, an example of the present invention is described.

In FIG. 1, 1 is a lateral type fryer vessel, and three vessels are provided in this example. On one end of the fryer vessel 1, a sealing lid 1a is mounted. 1b is a level gauge.

At the bottom of the fryer vessel 1, a heater 2 is arranged so as to heat an oil to a desired temperature. A steam pipe 3, through which steam is supplied, is connected to the heater 2.

Also, at the bottom of the fryer vessel 1, an inlet for introducing a pipe 4 for feeding heated oil is opened so that oil may be fed from an oil heater 5. 4a is a return pipe.

Steam is supplied from the steam pipe 3 to the oil heater 5 so as to heat the oil for frying. The oil heater 5 is connected to a supplementing tank 6 so that oil may be supplemented if desired.

A waggle frame 7 is housed within the above fryer vessel 1, which is movable vertically by an air cylinder 8. Air pipes 9, which are connected through a change-over valve 10 to an air compressor 11, are connected to the air cylinder 8.

A limit switch 12 detects the respective positions of the ascending end and the descending end of the above waggle frame 7 and performs a change-over operation of the above change-over valve 10. The starting material frying case 13 can be housed within the above waggle frame 7, so as to be freely dischargeable.

An evacuation pipe 14 is connected to the upper portion of the above fryer vessel 1, which introduces the vapor within the fryer vessel 1 into a mist separator 15. The mist separator 15 is further connected to a first condenser 16. Cooling water is introduced into the first condenser 16 from a cooling water pipe 17, and a second condenser 18 is also connected thereto.

In the Figure, 19 is a drain tank, 20 is an auxiliary vacuum pump, 21 a main vacuum pump, 22 an oil reservoir, 24 an oil filter, 23 an oil circulating pump, 25 a vacuum valve, and 26 a valve. Next, the mode of operation of the above exemplary device is described.

First, the oil in the oil reservoir 22 is introduced into the oil heater 5 by the oil circulating pump 24, to be heated, and then sent through the pipe 4 to feed oil into the fryer vessel 1, and then circulated by passing through the oil filter 24. Further, the flow of the oil is adjusted by the heater 2.

Next, by opening the sealing lid 1a of the fryer vessel 1, the starting material frying case 13 filled with a starting material is mounted within the waggle frame 7.

After the above sealing lid 1a is resealed, the main vacuum pump 21 and the auxiliary vacuum pump 20 are run, and when the auxiliary vacuum pump 20 reaches 50 to 100 Torr, the evacuation system is changed to that of the main vacuum pump 21 by the vacuum valve 25. When the vacuum degree reaches 10 Torr or higher, the solenoid of the change-over valve 10 is turned ON to actuate the air cylinder 8.

The air cylinder 8 causes the waggle frame 7 to descend and dip the starting material frying case 13 into the oil, thereby beginning to fry the starting material in the starting material frying case 13.

When the waggle frame 7 reaches the descent limit, the limit switch 12 activates the change-over valve 10 to cause the waggle frame 7 to ascend. When the waggle frame 7 ascends above the oil surface, the limit switch 12 activates the change-over valve 10 to cause the waggle frame 7 to again descend into the oil.

As described above, the operation of dipping the waggle frame 7 into and withdrawing it above the oil is repeated for several minutes, to cook the starting material in the starting material case 13, and after an elapse of a predetermined time, the cooked material is left to rest in the oil, by actuation of a timer, for finishing cooking, and finally, the waggle frame 7 is withdrawn from the oil by the air cylinder 8 and draining of the oil is effected by waggling the frame above the oil surface.

Then, when the vacuum valve 25 is closed, the valve 26 is opened to return the pressure in the fryer vessel 1 to atmospheric, and the starting material frying case 13 within the waggle frame 7 is taken out from within the fryer 1 by opening the sealing lid 1a, and the product is then taken out.

In carrying out the frying process by repeating the above operation, the oil is supplemented to a desired oil level by observing the level gauge 1b. The frying process was conducted by repeating the above operations for the three fryer vessels according to the following pattern.

|   | Upper stage fryer | Middle stage fryer | Lower stage fryer |
|---|---|---|---|
| 1 | Running | Preparing | Taking out |
| 2 | Taking out | Running | Preparing |
| 3 | Preparing | Taking out | Running |

Running: the step of frying the starting material.

Preparing: the preparatory steps of charging the starting material, maintaining a predetermined vacuum degree with the auxiliary vacuum pump, controlling oil temperature, etc.

Taking out: the step of taking out the material from within the fryer after completion of the frying process.

After the completion of the frying process, the used oil in each fryer vessel is collected into the oil reservoir 22 and placed under a reduced pressure (vacuum), whereby oxidation of the used oil is prevented, and thus no problems arise concerning reutilization. In the following, some preparation examples of the above frying process are described.

PREPARATION EXAMPLE 1

Apples were sliced into chips and soaked in a low sugar thick malt syrup adjusted to a sugar degree of 35 to 45 Bricks at a temperature of 20° C. for 4 to 6 hours. After draining off the syrup, the chips were placed in a rectangular wire cage with a height of 200 mm, introduced into the case of a vacuum fryer, and the case was moved vertically. The number of vertical movements of the vacuum fryer may be variable from about 1 to 20 times/minute.

In the vacuum fryer, frying was performed under the conditions of a vacuum degree of 5 to 20 Torr and an oil temperature of 110° C.

Figure 2:
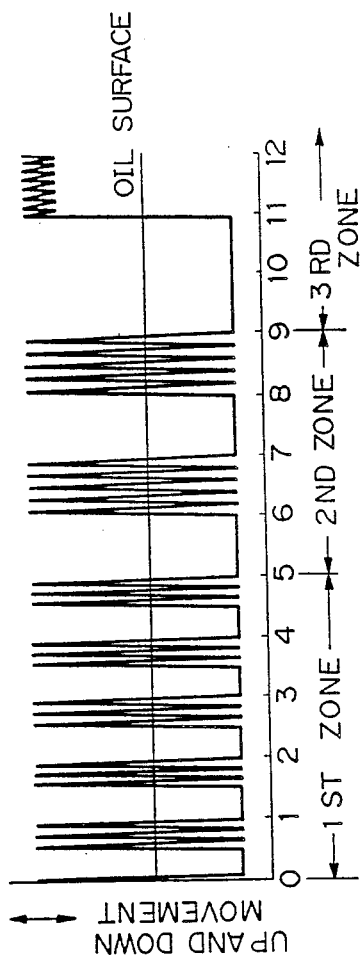
FIG. 2 is a graph showing the vertical movement operation in the first preparation example of the process of the present invention.

As shown in the graph in FIG. 2, of the total frying time of 12 minutes, vertical movement was performed five times/minute at intervals of 30 seconds for 5 minutes in a first frying zone or phase after the initiation of frying, then at intervals of one minute for the next 4 minutes in a second frying zone or phase, further standing in oil in a third flying zone or phase performed for the next 3 minutes, followed by vertical movements with very small amplitudes (30–50 m/m) on recording the final oil temperature (finishing oil temperature) of 90°–95° C. for 30 seconds, to complete the frying process.

Figure 3:
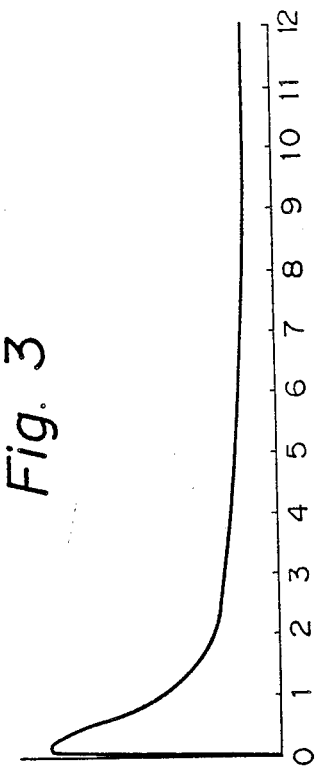
FIG. 3 is a graph showing the drying condition of the starting material.

For the drying condition of the starting material during the above operations, the result as shown in FIG. 3 was obtained.

Therefore, in the first zone, most of the constant rate drying is effected within 10–15 seconds from the start-up, followed by the reduced rate drying zone, and the movement in the first zone is necessary for uniformalization of the temperature distribution and the prevention of mutual adhesion between the chips.

In the second zone, where drying has proceeded to a considerable extent, the article is handled so as not to be broken, and the third zone is the zone for controlling the final water content. The final step is the oil draining of the case and the fry box, and the product is moved vertically with an amplitude of 10 to 50 mm as shown in FIG. 2. When the final oil draining step was conducted, a reduction of the oil content by about 3 to 5% was observed as compared with the case when no such operation was conducted.

Consequently, highly satisfactory results could be obtained with the fried product of apple chips, in that there was no adhesion between the chips or color fading, and there was a good taste and good oil draining.

The results of comparison with the vacuum fryer which was not vertically moved are shown in Table 1.

TABLE 1

|  | Taste | Color | Flavor | Oil content | Drying degree |
|---|---|---|---|---|---|
| Preparation example 1 | +++ | +++ | +++ | 15–20% | +++ |
| When fried without vertical movement | ++ | + | ++ | 20–25% | + Much layered and dried product |

Note: (+++) very good, (++) common, (+) slightly inferior

PREPARATION EXAMPLE 2

Pineapple cut in round slices was applied with the same treatment as Preparation Example 1 by using a fine white sugar syrup and under the operational conditions shown below by means of the same device as in Preparation Example 1.

(1) Operational conditions:
   Oil temperature 120° C.,
   Frying times 15 minutes,
   Operational vacuum degree 10 Torr or lower,
   Final temperature 94° C.

Figure 4:
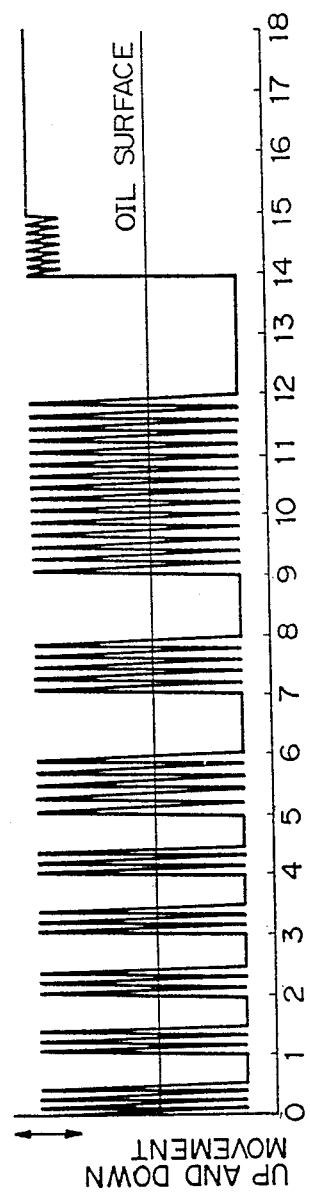
FIG. 4 is a graph of the vertical movement operation in the second Preparation Example.

(2) Vertical movement condition:

As shown in FIG. 4, vertical movement was performed 5-6 times/minute at intervals of 30 seconds for 5 minutes in a first frying phase after the initiation of frying, 4-6 times/minute at intervals of 1 minute for the next 5 minutes, and 3-6 times/minute after 2 minutes for the next 3 minutes in a second frying phase. After the elapse of 15 minutes, vertical movement with an amplitude of 30-50 m/m was performed for 5 to 10 times, followed further by standing in vacuum for 3 minutes, the product was then taken out by breaking the vacuum, and cooled.

(3) Results:

The results of comparison between the product obtained by frying while performing vertical movement as described above and the product obtained by drying without vertical movement are shown in Table 2.

TABLE 2

|  | Taste | Color | Flavor | Oil content | Drying degree |
|---|---|---|---|---|---|
| Preparation example 1 | +++ | +++ | +++ | 15-20% | +++ |
| When fried without vertical movement | ++ | + | ++ | 18-25% | Much layered and dried product |

Note: (+++) very good, (++) common

Consequently, the product according to the method of Preparation Example 2 was found to be very good and satisfactory results were obtained.

In contrast, the product obtained by frying for 15 minutes without performing vertical movement was dried non-uniformly and had a bad taste and color.

PREPARATION EXAMPLE 3

Pumpkin sliced into chips was pretreated in the same manner as in Preparation Example 1 and fried under the following operational conditions by means of the same device as in Preparation Example 1.

(1) Operation conditions:
   Oil temperature 110° C.,
   Frying time 9-10 minutes,
   Operational vacuum degree 10 Torr or lower,
   Final temperature 95° C..

Figure 5:
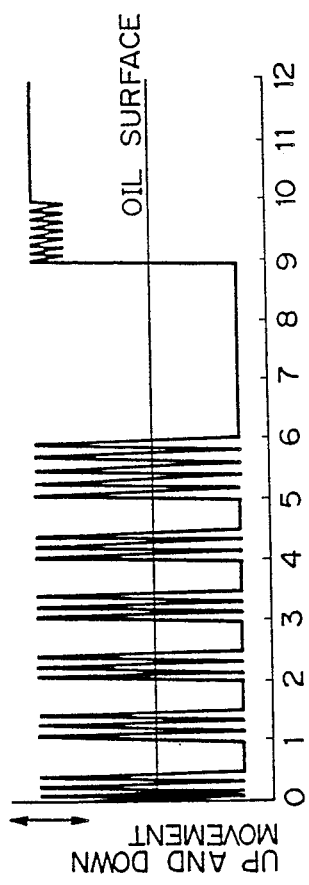
FIG. 5 is a graph of the vertical movement operation in the third Preparation Example.

(2) Vertical movement condition:

For 5 minutes after the initiation of frying, vertical movement was performed in a first frying phase 5-6 times/minute at intervals of 30 seconds, and for the next 3 minutes 4-6 times/minute at intervals of 1 minute as shown in FIG. 5, 9-10 minutes later, vertical movement was conducted 5-10 times with amplitudes of 30-50 mm, followed by standing in vacuum for 1 to 2 minutes, the product was taken out by breaking the vacuum, and cooled.

(3) Results:

The results of comparison between the product fried with vertical movement and the product fried without vertical movement are shown in Table 3.

TABLE 3

|  | Taste | Color | Flavor | Oil content | Drying degree |
|---|---|---|---|---|---|
| Preparation example 1 | +++ | +++ | +++ | 15-18% | +++ |
| When fried without vertical movement | + | ++ | ++ | 18-22% | Much layered and dried product |

Note: (+++) very good, (++) common, (+) slightly inferior

Consequently, very satisfactory results could be obtained for the product according to the method of Preparation Example 3, while the product fried for 9-10 minutes without vertical movement was found to be irregularly dried with a bad taste and color.

PREPARATION EXAMPLE 4

Sweet potato, kiwi, papaya and mango were treated in the same manner as in Preparation Example 1 and the above starting materials were fried under the following conditions by means of the same device as in Preparation Example 1.

(1) Operational conditions:

TABLE 4

|  | Initiation temperature | Final temperature | Frying time | Operational vacuum |
|---|---|---|---|---|
| Sweet potato | 120° C. | 115° C. | 15 min. | 10 Torr or lower |
| Kiwi | 115 | 90 | 9 | 10 Torr or lower |
| Papaya | 130 | 100 | 11 | Torr or lower |
| Mango | 120 | 100 | 15 | Torr or lower |

(2) Vertical movement condition:

For half of the total frying time after the initiation of frying, vertical movement was performed 5-6 times/minute at intervals of 30 seconds-1 minute, and 4-7 times/minute at intervals of 1 minute to 3 minutes for the next half of the time. On completion of the frying time, vertical movement with amplitude of 20 to 50 m/m was performed 5 to 10 times, followed by standing in vacuum for 1 to 5 minutes, the product was taken out by breaking the vacuum, and cooled.

(3) Results:

The results of comparison between the product fried with vertical movement and the product fried without vertical movement are shown in Table 5 and Table 6.

TABLE 5

| | Fried with Vertical Movement | | | |
|---|---|---|---|---|
|  | Sweet potato | Kiwi | Papaya | Mango |
| Taste | +++ | +++ | +++ | +++ |
| Color | +++ | +++ | +++ | +++ |
| Oil content | 15-20% | 15-22% | 15-22% | 15-22% |
| Flavor | +++ | +++ | +++ | +++ |
| Drying degree | No layers and properly dried product | Same as on left | Same as on left | Same as on left |

TABLE 6

| | Fried Without Vertical Movement | | | |
|---|---|---|---|---|
|  | Sweet potato | Kiwi | Papaya | Mango |
| Taste | ++ | ++ | ++ | ++ |
| Color | +++ | +++ | +++ | +++ |
| Oil content | 18-22% | 17-25% | 17-25% | 18-25% |

TABLE 6-continued

| | Fried Without Vertical Movement | | | |
|---|---|---|---|---|
| | Sweet potato | Kiwi | Papaya | Mango |
| Flavor | ++ | ++ | ++ | ++ |
| Drying degree | No layers and properly dried product | Many layers and not properly dried product | Same as on left | Same as on left |

Note: (+++) very good, (++) common, (+) slightly inferior

From the above results, the marked effects of vertical movement can be seen. That is, ① there is the effect of peeling of the fried produce being caused by the shock against the oil surface from the vertical movement, and ② there is the stirring effect of the vertical movement.

Therefore, there is no adhesion between the products due to the effect of ①, and there is no frying irregularity by uniformalization of the oil temperature due to the effect of ②.

PREPARATION EXAMPLE 5

Raw or boiled octopus, cuttlefish, scallop adductor, scallop strand, short-necked clam were fried under the following conditions by means of the same device as in Preparation Example 1.

(1) Operational conditions:

TABLE 7

| | Initial temperature | Final temperature | Frying time | Operational vacuum |
|---|---|---|---|---|
| Octopus | 130° C. | 105° C. | 15 min. | 10 Torr or lower |
| Cuttlefish | 130 | 105 | 13 | 10 Torr or lower |
| Scallop adductor | 110 | 95 | 10 | 10 Torr or lower |
| Scallop strand | 110 | 95 | 7 | 10 Torr or lower |
| Short-necked clam | 110 | 95 | 10 | 10 Torr or lower |

(2) Vertical movement condition:

For ⅓-½ of the total frying time after frying initiation, vertical movement was performed 5-6 times/minute at intervals of 30 seconds to 1 minute (at initiation of frying, the number of vertical movements is increased), and 4-7 times/minute at intervals of 1 minute to 3 minutes for the remainder of the time. On completion of the frying time, vertical movements with an amplitude of 10 to 50 m/m were further performed, followed by standing in vacuum for 1 to 5 minutes, the product was taken out by breaking the vacuum, and cooled.

(3) Results:

The results of comparison between the product fried with vertical movement and the product fried without vertical movement are shown in Table 8 and Table 9.

TABLE 8

| | Fried with Vertical Movement | | | | |
|---|---|---|---|---|---|
| | Octopus | Cuttlefish | Scallop adductor | Scallop strand | Short-Necked clam |
| Taste | +++ | +++ | +++ | +++ | +++ |
| Color | +++ | +++ | +++ | +++ | +++ |
| Flavor | +++ | +++ | +++ | +++ | +++ |
| Oil Content | 10-15% | 10-15% | 11-18% | 10-15% | 10-15% |
| Drying degree | +++ | +++ | +++ | +++ | +++ |

TABLE 9

| | Fried without Vertical Movement | | | | |
|---|---|---|---|---|---|
| | Octopus | Cuttlefish | Scallop adductor | Scallop strand | Short-necked clam |
| Taste | ++ | ++ | +++ | ++ | ++ |
| Color | +++ | +++ | ++ | ++ | ++ |
| Flavor | ++ | ++ | ++ | ++ | ++ |
| Oil content | 15-20% | 15-20% | 15-20% | 15-20% | 15-20% |
| Drying degree | With drying irregularity | Same as on left | Same as on left | Same as on left | Same as on left |

Note: (+++) very good, (++) common

As can be seen from the above results, the effect of the vertical movement is markedly exhibited.

Effect of the Invention (1) By placing the starting material in a fryer filled with heated oil to an intermediate level and repeating the operation of dipping into oil and withdrawing above the oil surface by vertical movement of the fryer for several minutes, not only can mutual adhesion between the starting material be prevented, but also an even and uniform frying can be performed to produce homogeneous products.

(2) Since the starting material is left to stand for a while in the oil after the above vertical movement operation, the fried product has an improved taste, color and flavor.

(3) By performing final oil draining by vibration with small amplitudes above the oil, not only is the flavor increased with a reduced oil content without drying irregularities, but the reduction of the oil content becomes less.

What is claimed:

1. A process for producing fried food, comprising the steps of:
   (a) placing pieces of a food material suitably pretreated into a vessel filled to an intermediate level with heated oil;
   (b) creating a vacuum in the vessel;
   (c) performing a first vacuum frying phase by immersing the material in the oil, then moving the material vertically for several cycles at a first repetition rate to alternately withdraw the material above the surface of the oil and dip the material into the oil for short periods of time, then allowing the material to rest submerged in the heated oil for a period of time substantially longer than said short periods of time, and repeating the moving operation and resting operation several times in sequence so as to partially dry the food while preventing adhesion between pieces;
   (d) performing a second vacuum frying phase by alternately repeating each of the moving operating and resting operation at a second repetition rate of longer time periods than said first repetition rate, to further dry the material without breakage of pieces;
   (e) performing a third vacuum frying phase by allowing the material to remain immersed for a time period sufficient to attain a desired final water content; and
   (f) vibrating the material with small amplitude vibrations while held above the oil surface to remove oil therefrom.

2. A process for producing fried food as recited in claim 1, wherein said first frying phase is performed for a period of approximately five minutes.

* * * * *

UNITED STATES PATENT AND TRADEMARK OFFICE
CERTIFICATE OF CORRECTION

PATENT NO.    : 4,985,266
DATED         : January 15, 1991
INVENTOR(S)   : SAKUMA It is certified that error appears in the above-identified patent and that said Letters Patent is hereby corrected as shown below:

On the title page, item [73], Assignee's first name is listed twice. It should read --Kenji Sakuma--.

On the title page, item [57], second paragraph, line 18, before "fryer" please insert --the heated oil filled to an intermediate level in the--.

Signed and Sealed this

Twenty-second Day of December, 1992

Attest:

DOUGLAS B. COMER

*Attesting Officer*    Acting Commissioner of Patents and Trademarks